United States Patent
Huang

(10) Patent No.: US 6,409,412 B1
(45) Date of Patent: Jun. 25, 2002

(54) ADJUSTABLE LOCKING/UNLOCKING STRUCTURE FOR TELESCOPIC TUBE

(76) Inventor: Chien-Jen Huang, No. 24, Alley 140, Da Quan Rd. Sec. 2, Panchiau Taipei Hsien (TW)

( * ) Notice: Subject to any disclaimer, the term of this patent is extended or adjusted under 35 U.S.C. 154(b) by 0 days.

(21) Appl. No.: 09/756,713

(22) Filed: Jan. 10, 2001

(51) Int. Cl.[7] .................................................. F16B 7/14
(52) U.S. Cl. ............................. 403/109.3; 248/188.5; 248/411; 403/109.1
(58) Field of Search ........................... 403/109.1, 109.3, 403/109.5, 109.7, 379.1, 379.6, 322.3, 322.4, 325, 17, 33; 16/113.1, 405, 429; 248/188.5

(56) References Cited

U.S. PATENT DOCUMENTS

| | | | | |
|---|---|---|---|---|
| 2,806,723 A | * | 9/1957 | Fairclough | 248/188.5 |
| 3,734,441 A | * | 5/1973 | Lux | 248/354 |
| 3,893,730 A | * | 7/1975 | Homier et al. | 297/375 |
| 5,184,835 A | * | 2/1993 | Huang | 280/47.371 |
| 5,971,341 A | * | 10/1999 | Pfister | 248/411 |

* cited by examiner

Primary Examiner—Lynne H. Browne
Assistant Examiner—Michael P Ferguson
(74) Attorney, Agent, or Firm—Troxell Law Office PLLC

(57) ABSTRACT

Adjustable locking and unlocking structure for a telescopic tube, including two locating members mated with each other, an actuating push plate, a restoring spring, a main restricting plate, a subsidiary restricting plate, several restricting rings, a compression spring and an adjustment rod. The inner face of each of the locating members is formed with a central arch channel for the adjustment rod to pass therethrough. A middle rear section of the arch channel is cut with a trapezoid restricting cavity. A front and a rear walls of the tapered restricting cavity are formed with slope sides. Each of the main and subsidiary restricting plates includes a circular restricting ring section and a bent press section integrally connected with upper side of the restricting ring section. The restricting ring section is formed with a central restricting hole. Each of the restricting rings is formed with a central frictional stop hole slightly smaller than the restricting holes of the main and subsidiary restricting plates. The outer diameter of the adjustment rod is slightly smaller than the diameter of the stop hole of the restricting ring. By means of the structure, the daughter tube of the telescopic tube is more firmly located in the mother tube and can be stagelessly adjusted in length and the appearance of the telescopic tube will be ruined.

4 Claims, 4 Drawing Sheets

ADJUSTABLE LOCKING/UNLOCKING STRUCTURE FOR TELESCOPIC TUBE

BACKGROUND OF THE INVENTION

The present invention is related to a locking and unlocking structure for a telescopic tube, in which the daughter tube is firmly locked with the mother tube by means of restricting holes and frictional stop holes of restricting plates and restricting rings with biased axis. Therefore, the daughter tube can be stagelessly adjusted in length and more firmly locked with the mother tube. Moreover, the adjustment device and the adjustment rod are both installed in the daughter and mother tubes so that the appearance of the telescopic tube will not be affected.

FIG. 1 shows a conventional locking and unlocking structure of a telescopic tube. A daughter tube 11 is fitted in a mother tube 10. The outer diameter of the daughter tube 11 is slightly smaller than the inner diameter of the mother tube 10, whereby the daughter tube 11 can be freely moved within the mother tube 10. The circumferential wall of the mother tube 10 is formed with multiple adjustment holes 101 at equal intervals. The rear end of the daughter tube 11 is formed with a through hole 111 in which a V-shaped snap button 112 is mounted. The snap button 112 has a press section 113 protruding out of the through hole 111 of the daughter tube 11 into one of the adjustment holes 101 of the mother tube 10 at a certain length. When adjusted, the press section 113 is pressed inward to disengage from the adjustment hole 101. Under such circumstance, the daughter tube 11 is unlocked and can be freely moved within the mother tube 10 to a certain length. When the press section 113 is again bounded into a certain adjustment hole 101, the daughter tube 11 is again locked with the mother tube 10.

The above structure has a shortcoming as follows: The adjustment holes 101 of the mother tube 10 are arranged at certain intervals so that the daughter tube 11 cannot be stagelessly adjusted. As a result, a user may be unable to adjust the telescopic tube to an optimal length meeting the requirement of the height of the user.

SUMMARY OF THE INVENTION

It is therefore a primary object of the present invention to provide an adjustable locking and unlocking structure for a telescopic tube, in which the adjustment structure can be stagelessly adjusted so that a user can have a using length most suitable for the user's height. Therefore, the telescopic tube can be more conveniently used and the application range is wider.

It is a further object of the present invention to provide the above adjustable locking and unlocking device in which the daughter tube is firmly locked with the mother tube by means of restricting holes and frictional stop holes with biased axis. Therefore, in use or operation, the daughter tube is prevented from retracting into the mother tube. Therefore, the daughter tube is better located by the adjustment device.

It is still a further object of the present invention to provide the above adjustable locking and unlocking device in which the adjustment device and the adjustment rod are both installed and hidden in the daughter tube and mother tube so that the appearance of the telescopic tube will not be affected.

The present invention can be best understood through the following description and accompanying drawings wherein:

DETAILED DESCRIPTION OF THE PREFERRED EMBODIMENT

Figure 1:
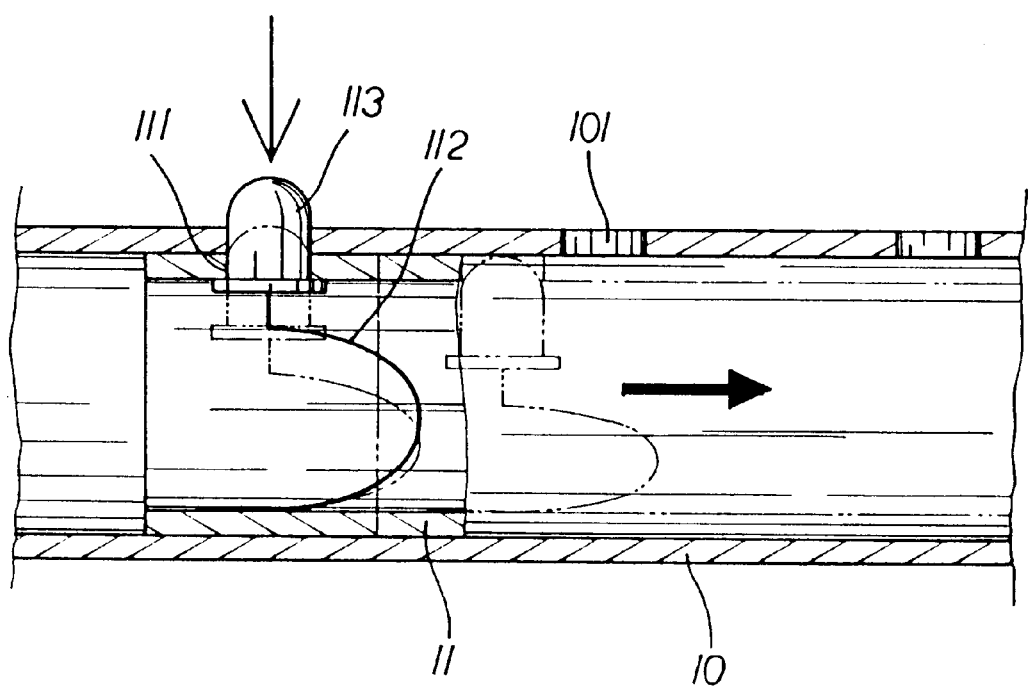
FIG. 1 is a sectional assembled view of a conventional locking structure of telescopic tube, showing the operation thereof.
Figure 2:
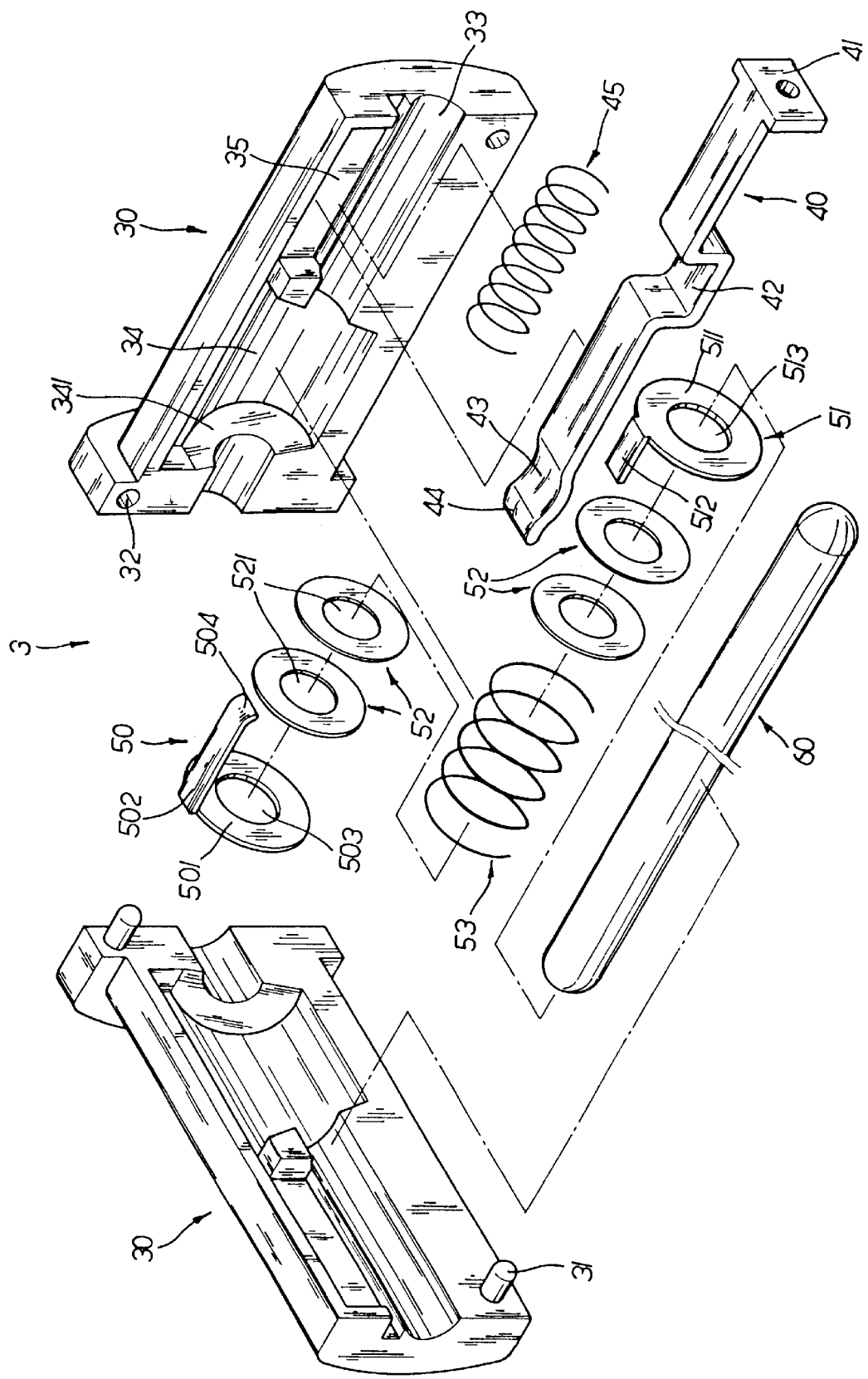
FIG. 2 is a perspective exploded view of the present invention.

Please refer to FIG. 2. The present invention includes two locating members 30 mated with each other, an actuating push plate 40, a restoring spring 45, a main restricting plate 50, a subsidiary restricting plate 51, several restricting rings 52, a compression spring 53 and an adjustment rod 60. The two locating members 30 are symmetrical to each other. The corners of inner sides of the locating members 30 are respectively formed with locating posts 31 and locating sockets 32. Each of the locating members 30 is formed with a central arch channel 33 for the adjustment rod 60 to pass therethrough. The middle rear section of the arch channel 33 is cut with a restricting cavity 34 which is downward tapered into a trapezoid shape. The upper side of front section of the locating member 30 is further cut with a slide channel 35 above the arch channel 33. The actuating push plate 40 is slidably received in the slide channel 35. The front and rear walls of the tapered restricting cavity 34. are slope sides 341. The front end of the push plate 40 is bent to form a push, section 41. The middle portion of the push plate 40 is bent to form a U-shaped stop section 42. The push plate 40 is further bent to form a slightly recessed arch press section 43 near rear end thereof for pressing the subsidiary restricting plate. The rear end of the push plate 40 slightly upward turns to form a main restricting plate press section 44. The main restricting plate 50 includes a circular restricting ring section 501 and a bent press section 502 integrally connected with upper side of the restricting ring section 501 and extending therefrom by a certain length. The restricting ring section 501 is formed with a central restricting hole 503. The free end of the press section 502 is bent to form a driving section 504 having a shape corresponding to the main restricting plate press section 44. The subsidiary restricting plate 51 includes a circular restricting ring section 511 and a bent press section 512 integrally connected with upper side of the restricting ring section 511 and extending therefrom by a shorter length. The restricting ring section 511 is formed with a central restricting hole 513. Each of the restricting rings 52 is formed with a central frictional stop hole 521 slightly smaller than the restricting holes 503, 513 of the main and subsidiary restricting plates 50, 51. The outer diameter of the adjustment rod 60 is slightly smaller than the diameter of the stop hole 521 of the restricting ring 52. The adjustment rod 60 has a length equal to that of the mother tube 70.

Figure 3:
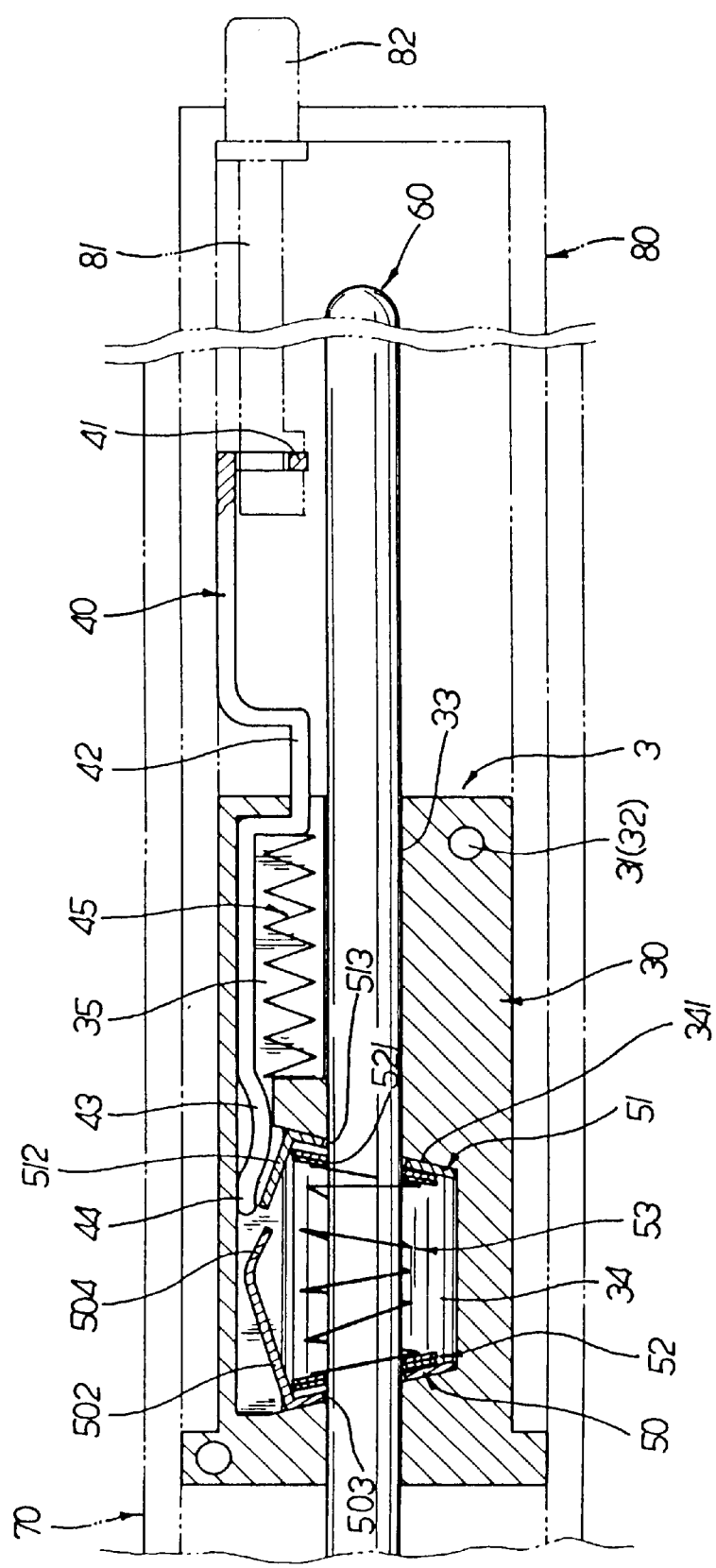
FIG. 3 is a sectional assembled view of the present invention.

When assembling the adjustment device 3, as shown in FIG. 3, the main and subsidiary restricting plates 50, 51 are respectively positioned in the restricting cavities 34 of the locating members 30. The restricting ring sections 501, 511 of the main and subsidiary restricting plates 50, 51 are inclinedly attached to the slope sides 341. The restricting holes 503, 513 are inclinedly aligned with the arch channels 33. Then, a certain number of restricting rings 52 are positioned between the opposite faces of the main and subsidiary restricting plates 50, 51 and inclinedly attached to the restricting ring sections 501, 511. At this time, the frictional stop holes 521 of the restricting rings 52 are inclinedly aligned with the restricting holes 503, 513. Then the compression spring 53 is positioned between two innermost restricting rings 52 with two ends of the compression spring 53 abutting against the inner faces of the restricting rings 52. Under such circumstance, the main and subsidiary restricting plates 50, 51 and the restricting rings 52 are retained by the compression spring 53 to truly attach to the slope sides 341. By means of pressing the press sections 502, 512, the restricting ring sections 501, 511 are inward biased to compress the compression spring 53. Then the push plate 40 is placed into the slide channel 35 with the stop section 42 fitted in a front opening thereof. The main restricting plate press section 44 and the subsidiary restricting plate press section 43 are passed through the slide channel 35 and respectively received in the restricting cavity 34. Then the restoring spring 45 is placed into the slide channel 35 with two ends respectively abutting against a wall of the slide channel 35 and the stop section 42 of the push plate 40. Then the two locating members 30 are mated with each other with the locating posts 31 inserted into the locating sockets 32. The adjustment device 3 is fitted in a rear end section of the daughter tube 80. A linking unit 81 is disposed in the daughter tube 80 and attached to the push section 41 of the adjustment device 3. The linking unit 81 extends to a front end section of the daughter tube 80 to connect with a press button 82 arranged on outer side of the daughter tube 80. The adjustment rod 60 is fixedly inserted in a bottom end of the mother tube 70. By means of inserting the adjustment rod 60 into the arch channels 33 of the locating members 30, the daughter and mother tubes 80, 70 are fitted with each other.

Figure 4:
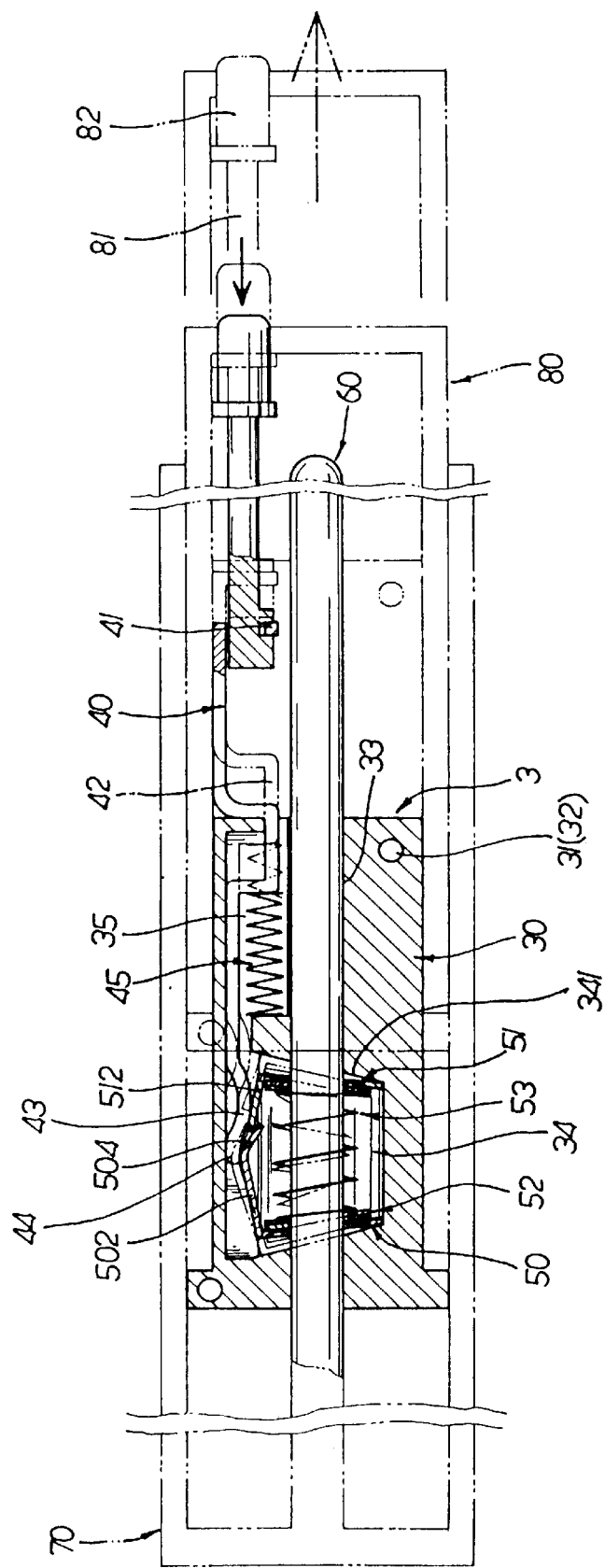
FIG. 4 is a sectional assembled view according to FIG. 3, showing the adjustment operation of the present invention.

When adjusted, as shown in FIG. 4, the press button 82 is pressed to via the linking unit 81 transmit the pressing force to the push section 41. At this time, the push plate 40 is driven to slide rearward and compress the restoring spring 45. When the main restricting plate press section 44 and the subsidiary restricting plate press section 43 are slided to press and attach to the driving section 504 of the main restricting plate 50 and the press section 512 of the subsidiary restricting plate 51, the restricting ring sections 501, 511 of the main and subsidiary restricting plates 50, 51 are pressed to drive the restricting rings 52 inward into an upright state. At this time, the restricting holes 503, 513 and the frictional stop holes 521 are positioned upright and completely parallelly aligned with the arch channels 33. Also, the compression spring 53 is pushed and compressed by the inward driven restricting rings 52. Under such circumstance, all the holes of the adjustment device 3 are parallelly coaxially aligned with each other, permitting the adjustment device 3 to be freely moved and adjusted along the adjustment rod 60. Therefore, the daughter tube 80 can be extended out of the mother tube 70 by a certain length. After the adjustment is completed, the adjustment device 3 is released from the external pressing force and the restoring spring 45 restores to its home position. Also, the push plate 40 is driven to restore to its home position. At this time, the main and subsidiary restricting plates 50, 51 and the restricting rings 52 are free from the pressing force and restored to their home positions by the compression spring 53. When the main and subsidiary restricting plates 50, 51 and the restricting rings 52 are restored to their home positions, the restricting holes 503, 513 and the frictional stop holes 521 thereof are again restored to a state inclined from the arch channels 33. Under such circumstance, the holes are not coaxial so that the frictional stop holes 521 of the respective restricting rings 52 are biased against the adjustment rod 60 to exert a frictional fixing force thereon. The more the restricting rings 52 are, the better the fixing force is. At this time, the adjustment device 3 is firmly fixed by the restricting rings 52 without sliding so that the daughter tube 80 is truly located in the mother tube 70.

According to the above arrangement, the present invention has the following advantages:

1. The adjustment device can be stagelessly adjusted so that a user can have a using length most suitable for the user's height. Therefore, the telescopic tube can be more conveniently used and the application range is wider.

2. The daughter tube 80 is firmly locked with the mother tube 70 by means of restricting holes and frictional stop holes with biased axis. Therefore, in use or operation, the daughter tube 80 is prevented from retracting into the mother tube 70. Therefore, the daughter tube 80 is better located by the adjustment device 3.

3. The adjustment device 3 and the adjustment rod 60 are both installed and hidden in the daughter tube 80 and mother tube 70 so that the appearance of the telescopic tube will not be affected.

The above embodiment is only used to illustrate the present invention, not intended to limit the scope thereof. Many modifications of the above embodiment can be made without departing from the spirit of the present invention.

What is claimed is:

1. An adjustable locking and unlocking structure for a telescopic tube, comprising two locating members mated with each other, an actuating push plate, a restoring spring, a main restricting plate, a subsidiary restricting plate, several restricting rings, a compression spring and an adjustment rod, the actuating push plate and the restoring spring being disposed in slide channels formed on the locating members, said locking and unlocking structure including:

an inner face of each of the locating members is formed with a central arch channel for the adjustment rod to pass therethrough, a middle rear section of the arch channel being cut with a restricting cavity which is downwardly tapered into a trapezoid shape, a front and a rear walls of the tapered restricting cavity being formed with sloped sides;

the main restricting plate includes a circular restricting ring section and a bent press section integrally connected with an upper side of the restricting ring section and extending therefrom by a predetermined length, the restricting ring section being formed with a central restricting hole, a free end of the bent press section being bent to form a driving section;

the subsidiary restricting plate includes a circular restricting ring section and a bent press section integrally connected with an upper side of the restricting ring section and extending therefrom by a shorter length, the restricting ring section being formed with a central restricting hole;

each of the restricting rings is formed with a central frictional stop hole smaller than the restricting holes of the main and subsidiary restricting plates;

an outer diameter of the adjustment rod is smaller than the diameter of the stop hole of the restricting ring, the adjustment rod having a length equal to that of a mother tube; and the main and subsidiary restricting plates are respectively positioned in the restricting cavities of the locating members, the restricting ring sections of the main and subsidiary restricting plates being inclinedly attached to the slope sides of the restricting cavities, the restricting rings being positioned between the opposite faces of the main and subsidiary restricting plates, the compression spring being positioned between two innermost restricting rings, by means of pressing the press sections of the main and subsidiary restricting plates, the adjustment rod being fitted into the arch channels of the locating members, whereby a daughter tube is firmly located in the mother tube and can be stagelessly adjusted in length.

2. The adjustable locking and unlocking structure for telescopic tube as claimed in claim 1, wherein the adjustment structure is installed in a rear end section of the daughter tube.

3. The adjustable locking and unlocking structure for telescopic tube as claimed in claim 1, wherein the adjustment rod is fixed on a bottom face of the mother tube.

4. The adjustable locking and unlocking structure for telescopic tube as claimed in claim 1, wherein the number of the restricting rings can be changed as necessary and the greater the number of restricting rings, the greater the fixing force.

* * * * *